United States Patent
Hoskin (10) Patent No.: US 7,438,298 B1
(45) Date of Patent: Oct. 21, 2008

(54) STEERABLE SNOW SLED HAVING MULTIPLE PIVOT POINTS

(76) Inventor: Brice J. Hoskin, P.O. Box 730, Silverton, CO (US) 81433

( * ) Notice: Subject to any disclaimer, the term of this patent is extended or adjusted under 35 U.S.C. 154(b) by 265 days.

(21) Appl. No.: 11/356,478

(22) Filed: Feb. 17, 2006

Related U.S. Application Data (60) Provisional application No. 60/654,525, filed on Feb. 17, 2005.

(51) Int. Cl.
B62B 13/12 (2006.01)
B62B 13/08 (2006.01)
B62B 13/06 (2006.01)

(52) U.S. Cl. ......................................... 280/22; 280/21.1

(58) Field of Classification Search ................ 280/14.1, 280/21.1, 22.1, 23.1, 28.11, 15–19, 22, 28.13–28.16, 280/845; D12/6, 9–11
See application file for complete search history.

(56) References Cited

U.S. PATENT DOCUMENTS

| | | | | |
|---|---|---|---|---|
| 1,121,811 A * | 12/1914 | Dewinsky | ..................... | 280/22 |
| 1,489,289 A * | 4/1924 | Vogel | ........................... | 280/16 |
| 1,565,945 A * | 12/1925 | Leslie | ......................... | 280/22 |
| 1,722,574 A * | 7/1929 | Hood | ....................... | 280/87.01 |
| 1,820,044 A * | 8/1931 | Bowen | ......................... | 280/22 |
| 1,905,642 A * | 4/1933 | Kidder | ........................ | 280/22 |
| 1,938,701 A * | 12/1933 | Jones et al. | ..................... | 280/8 |
| 2,037,076 A * | 4/1936 | Kidder | ........................ | 280/22 |
| 2,243,345 A * | 5/1941 | Kidder | ........................ | 280/22 |
| 2,446,452 A * | 8/1948 | Benson | ........................ | 280/22 |
| 2,568,070 A * | 9/1951 | Holbrook | ..................... | 280/22 |
| 2,572,214 A * | 10/1951 | Sundberg | ..................... | 280/22 |
| 4,193,608 A * | 3/1980 | Gunderson | .................... | 280/8 |
| 6,349,950 B1 * | 2/2002 | Levy et al. | ..................... | 280/22 |

* cited by examiner

Primary Examiner—Christopher Ellis
Assistant Examiner—Vaughn T Coolman
(74) Attorney, Agent, or Firm—Richard S. Erbe (57) ABSTRACT

A steerable snow sled has a forward section pivotably joined to a rear section, with metal runners attached to the bottom of both sections. A steering arm is attached to the forward section. The forward section also includes a pivot assembly that is attached to the runners. The rear section includes several sliding connections between the sled and the runners that allow the runners to bend in an arc when a person riding the sled applies turning pressure to the steering arm.

2 Claims, 6 Drawing Sheets

STEERABLE SNOW SLED HAVING MULTIPLE PIVOT POINTS

RELATED APPLICATIONS

This application claims the benefit of U.S. Provisional Patent Application No. 60/654,525, filed Feb. 17, 2005, entitled "Double-pivot Runner Sled," incorporated herein by reference.

BACKGROUND OF THE INVENTION

1. Field of the Invention

The present invention relates to recreational devices for traveling down snow covered hills and slopes. More particularly, it relates to a runner sled that allows the user to steer and turn it while sitting or lying on it, utilizing pivotable and sliding connections at a number of locations on the sled.

2. General Background and State of the Art

Devices that allow a person to ride down a snow covered hill come in a wide variety of forms. Simple items such as sheets of cardboard, an inner tube or "flying saucers" are sometimes used to provide a way for a person to ride down a hill. These devices have the disadvantage of having no provision for steering the device.

Steerable devices for use by individuals in sliding down a hill generally can be said to fall into two distinctive categories: toboggans and runner sleds. A toboggan generally has a single layered structure (typically wood or plastic) on which one or more individuals sit and provide the necessary propulsion to get the toboggan started on its decent down a hill. Many toboggan designs include sides designed to keep snow out of the riding area and to also provide handholds for the riders. Typically, a toboggan is steered or turned by having the riders lean to their left or right. A toboggan works best on soft snow. Toboggans are difficult to steer effectively under ideal conditions and are almost impossible to turn on hard-packed snow or ice.

Runner sleds generally include a platform, generally constructed of wood, on which a rider or riders lie or sit. Attached to the lower surface of the platform are a number of runners (generally two or more) that may vary in width from very thin to very wide, in some cases as wide as a traditional ski. A steering arm or handle is used to turn the runners or skis, thereby turning the runner sled in the desired direction. Runner sleds work very well on hard-packed snow or ice. Runner sleds, however, can be difficult to turn under the best of conditions.

Thus, there exists a need for a steerable runner sled for use in sliding down snow covered hills that performs well on hard-packed snow or ice and on soft snow.

There also is a need for a steerable runner sled for use in sliding down snow covered hills that provides the user with the ability to turn and steer the sled with relative ease.

There also exists a need for a steerable runner sled for use in sliding down snow covered hills that is durable in construction.

The need also exists for a steerable runner sled for use in sliding down snow covered hills that provides several pivoting points or sliding connections the sled to allow for sharper and deeper turns than has previously been known with runner sleds.

SUMMARY OF THE INVENTION

The sled according to the present invention meets these needs and overcomes the disadvantages of known designs of runner sleds that are used by persons to ride down snow covered hills and provides the rider or riders with an improved and more satisfactory experience than with any previously-known design of runner sled.

A sled according to a preferred embodiment of the present invention provides an articulating runner sled that includes two distinctive sections, a forward section and a rear section. These two sections are attached to each other in a manner that allows a rider of the sled to turn the forward section of the sled right or left in relation to the rear section, while also bending the runners as the rider and sled are traveling down a snow covered hill, thus enabling the user to turn and steer the sled on a desired path. In the preferred embodiment of the invention, a pair of metal runners, disposed generally parallel to each other, are attached to the front and rear sections at several points.

The forward section and rear section are similar in the manner of their construction. Each section includes a solid top or platform made of wood, fiberglass, plastic or other durable material, preferably constructed by use of glued tongue-and-groove joints. Alternatively, each section could be of a slatted construction. The rear section is designed to support a rider who may either sit or lie on the sled.

The forward and rear sections are joined at a pivotable connection. A large, flat-head elevator bolt or other similar device is used to provide a turning point and a firm connection between the front and rear sections. In the preferred embodiment of the invention, large plastic washers are used between the two sections to minimize turning friction, and a large washer and locking nut are used to keep the connection tight. Other ways of forming the pivotable connection include using a rivet, a fixed metal rod welded at either end, a plastic rod that is enclosed at either end, or a flexible, durable piece of plastic or other elastic material that can twist to allow pivoting.

The forward section includes a steering arm that can be used by the rider to turn the forward section around the turning point in relation to the rear section. The rider may turn the forward section left or right to change the path taken by the sled while it is traveling on snow or ice.

The runners are connected to the forward section by means of a pivoting assembly attached by a fastener, which may be a bolt or rivet, for example, passing through the forward section to form a pivotable joint. The pivoting assembly includes a pair of connecting bars made from a metal or other rigid material. One end of each connecting bar is attached to the fastener at the pivotable joint. Each connecting bar extends away from pivotable joint, and its opposite end connects to one of the runners by means of a conventional fastener. A hard plastic sliding pad is attached to each of the connecting bars so that the pivoting assembly slides easily along the bottom surface of the forward section and also prevents the placement of fingers or other objects in the space formed between the pivoting assembly and the bottom surface of the forward section. Alternatively, the sliding pad can be manufactured as an integral part of the connecting bar.

The runners are each formed into four distinctive portions: a curved forward portion, a straight portion, a rear curved portion, and a connecting leg. The curved forward portion is attached to the pivoting assembly previously described, while the straight portion attaches to the sled's rear section in a number of places, as will be described. In the preferred embodiment of the invention, the runners are manufactured from relatively thin folded sheet metal or fiberglass that has the ability to repeatedly flex in response to turning pressure applied by a rider to the sled's steering arm. The runners are grooved for better tracking and control and are powder-coated to help minimize rusting.

The runners are attached to the rear section of the sled at several connections, which may include a combination of fixed or sliding connections, or all sliding connections. The sliding connections allow the runners to flex even more than previous designs of runner sleds during turning. Connection flanges extending between the straight portion of each runner and the bottom surface of the rear section of the sled provide a means of connection between the runners and the sled. The connection flanges preferably connect to one or more mounting panels attached to the bottom surface of the rear section, although it would be possible to attach the connection flanges directly to the bottom surface of the sled's rear section.

Sliding connections between the runners and the rear section of the sled are formed by means of elongated slots in the connection flanges where the connection flanges attach to the mounting panels or the bottom surface of the rear portion. Bolts passing through these elongated slots in the connection flanges create the sliding connections. Plastic washers are used at these connections to facilitate the sliding/pivoting action of the sled and runners. The configuration of the elongated slots, bolts and plastic washers allows the attachment flanges to slide in relation to the sled and the runners to bend into an arc when the steering arm is turned by the person riding the sled.

While various numbers and locations of connections attaching the runners to the rear section of the sled are possible, in the preferred embodiment of the invention, these connections are located at an intermediate point (approximately the middle of the length of the rear section) and proximate the back end (the end furthest from the forward section) of the rear section. The intermediate connections will be of the sliding type described. In the preferred embodiment of the invention, the rear connections will be fixed and not allow sliding. Alternatively, the rear connections may be of the sliding type, constructed in the same manner as the intermediate connections.

Further objects and advantages of this invention will become more apparent from the following descriptions of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiments of the invention with reference to the drawings in which.

DETAILED DESCRIPTION OF THE PREFERRED EMBODIMENTS OF THE INVENTION

In the following description of the invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention, and structural and functional changes may be made thereto, without departing from the scope of the present invention.

The preferred embodiment of a recreational sliding device according to the present invention, generally in the form of a runner sled, is illustrated in FIGS. 1-10 and is referred to by the reference numeral 10.

Sled 10 is divided into two main sections, forward section 20 and rear section 70. A pivotable fastening means, indicated by the reference numeral 140, secures forward section 20 to rear section 70 and allows forward section 20 to be pivoted in relation to rear section 70, thus allowing a person or persons using sled 10 to turn and steer the sled while it is sliding down a hill.

Forward section 20 includes a first platform 22 having a top surface 24 and a bottom surface 26. First platform 22 also includes an opening 28 which accommodates pivotable fastening means 140, which will be described in more detail later.

An important feature of sled 10 is steering arm 60, which is attached to top surface 24 of forward section 20 by means of fasteners 62, which are inserted through openings in steering arm 60 and openings in top surface 24. Steering arm 60, as mentioned previously, provides the ability for a user of sled 10 to turn forward section 20 in relation to rear section 70 to provide the ability to turn and steer sled 10 by the application of pressure on steering arm 60.

A tow rope 64, which is secured to steering arm 60 by means of tow rope openings 66, allows for easy pulling and transporting of sled 10 when it is not being used to slide down a hill.

Rear section 70 includes a second platform 72 having a top surface 74 and a bottom surface 76. Second platform 72 also includes an opening 78 which accommodates pivotable fastening means 140, which will be described in more detail later.

Figure 1:
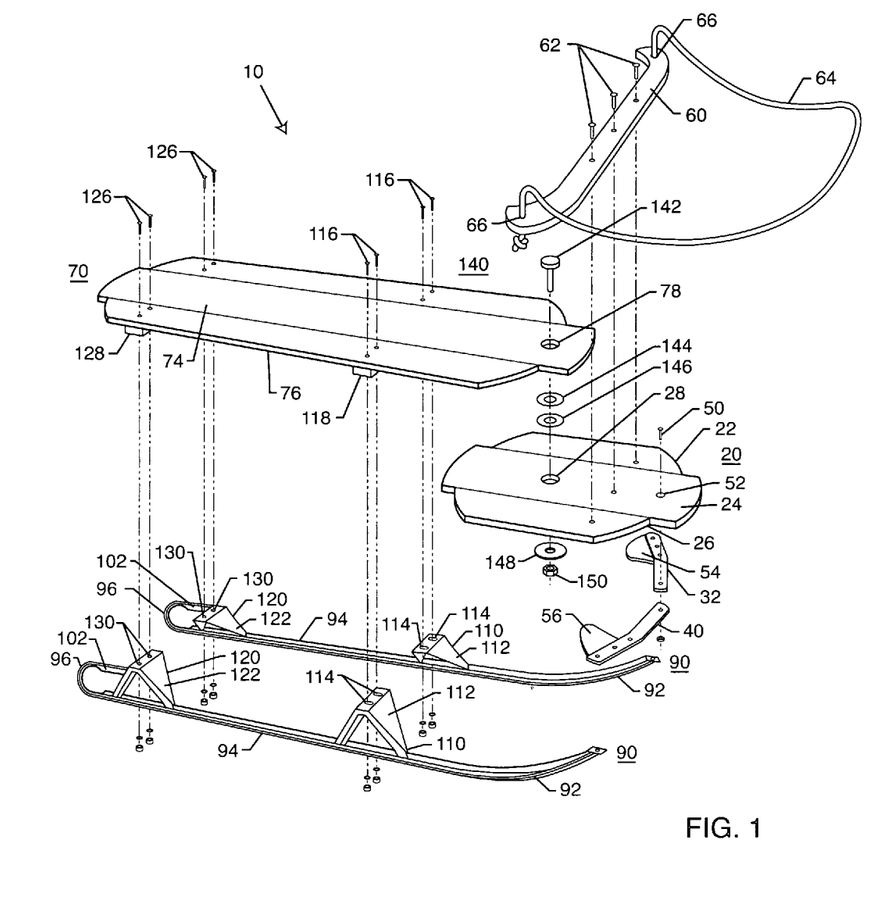
FIG. 1 illustrates an exploded perspective view of an exemplary sled according to the present invention.
Figures 2, 3:
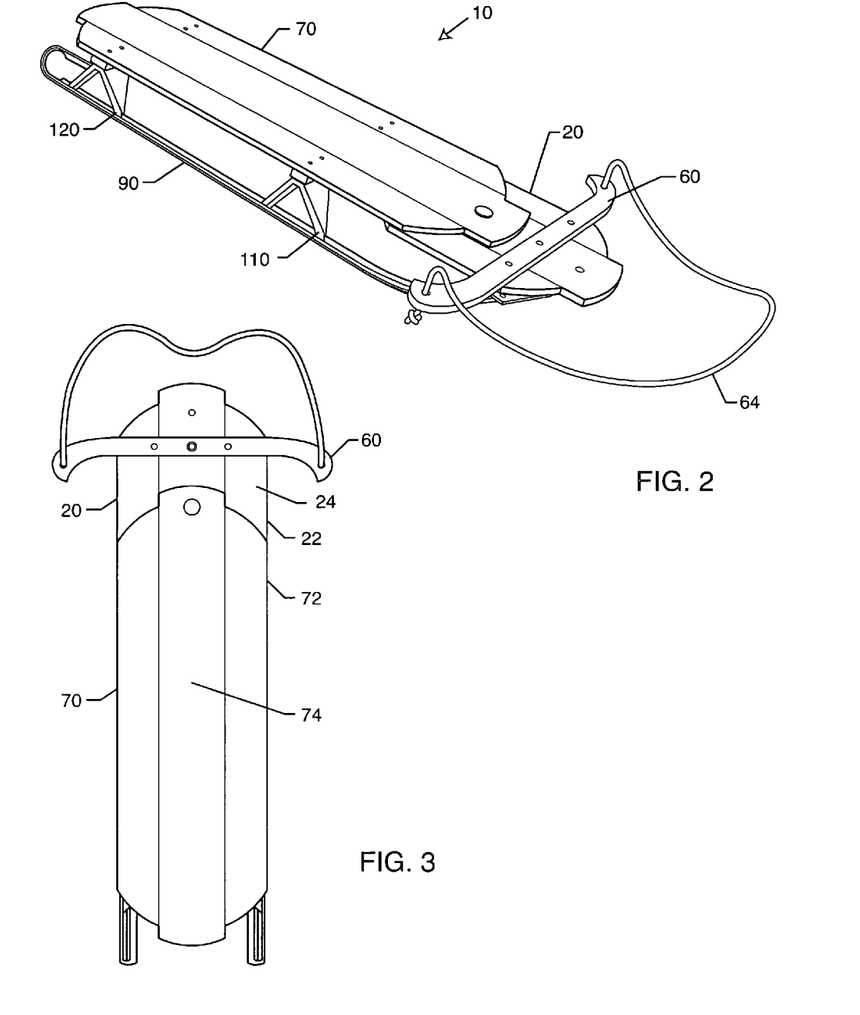
FIG. 2 illustrates a perspective view of an exemplary sled according to the present invention.
FIG. 3 illustrates a plan view of an exemplary sled according to the present invention.
Figure 8:
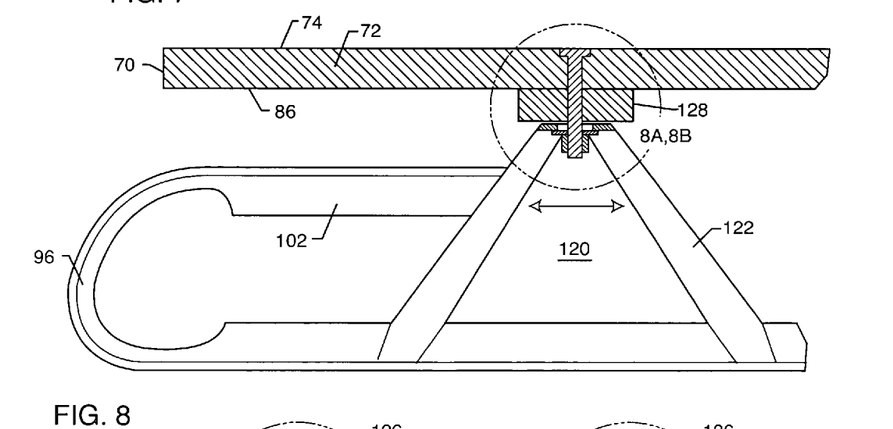
FIG. 8 illustrates a sectional view taken along line 8-8 in FIG. 6, showing one of the elongated slots on the connection flange centered on the fasteners when the runner is not flexed or curved.

FIGS. 1, 2, 4 and 9 illustrate the structure of runners 90 of sled 10. Runners 90 each have four distinctive portions: curved forward portion 92, straight portion 94, rear curved portion 96, and connecting leg 102, which connects rear curved portion 96 to rear connection 120, as best illustrated in FIGS. 1 and 8. Runners 90 each have a contact surface 98 that slides on the snow or ice surface on which sled 10 is traveling. Runners 90 are made from folded sheet metal, fiberglass, or other material that has the ability to repeatedly flex to enhance the turning and steering motion of the sled.

The location and structure of the connections between runners 90 and sled 10 are important factors that allow runners 90 to be flexed and curved to enhance the turning ability of sled 10.

FIGS. 1, 4, 4A, 7 and 9 best illustrate how curved forward portion 92 of each runner 90 is connected to sled 10. Curved forward portions 92 of runners 90 are connected to pivoting assembly 30 (which is identical in the preferred and alternative embodiments of the invention), which is shown in detail in FIG. 7, at connecting points 38 and 46. Pivoting assembly 30 consists of a pair of connecting bars, first connecting bar 32 and second connecting bar 40. First connecting bar 32 includes first end 34 and second end 36; second connecting bar 40 includes first end 42 and second end 44. Connecting bars 32 and 40 are constructed from a rigid metal, plastic or other durable material.

Figure 7:
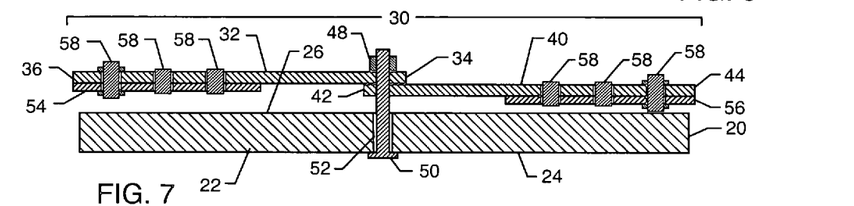
FIG. 7 illustrates a sectional view taken along line 7-7 in FIG. 4 illustrating the pivoting assembly that can be used with the preferred and alternative embodiments of the invention.

First ends 34 and 42 of connecting bars 32 and 40 are joined to each other and to pivoting assembly 30 at pivotable joint 48 by joint fastener 50, which is inserted through opening 52 in forward section 20. Second ends 36 and 44 of connecting bars 32 and 40 connect to runners 90 at connecting points 38 and 46 respectively. Attached to each connecting bar is a sliding pad. First sliding pad 54 is connected to first connecting bar 32 with fasteners 58, while second sliding pad 56 is connected to second connecting bar 40 by fasteners 58. The purpose of sliding pads 54 and 56 is to enable pivoting assembly 30 to easily slide along bottom surface 26 and to prevent riders from having their fingers get caught between the pivoting assembly 30 and bottom surface 26. While in the preferred embodiment of the invention sliding pads 54 and 56 are attached to connection bars 32 and 40 by means of fasteners, those skilled in the art will recognize that sliding pads 54 and 56 may be manufactured as an integral part of connecting bars 32 and 40.

Figure 9:
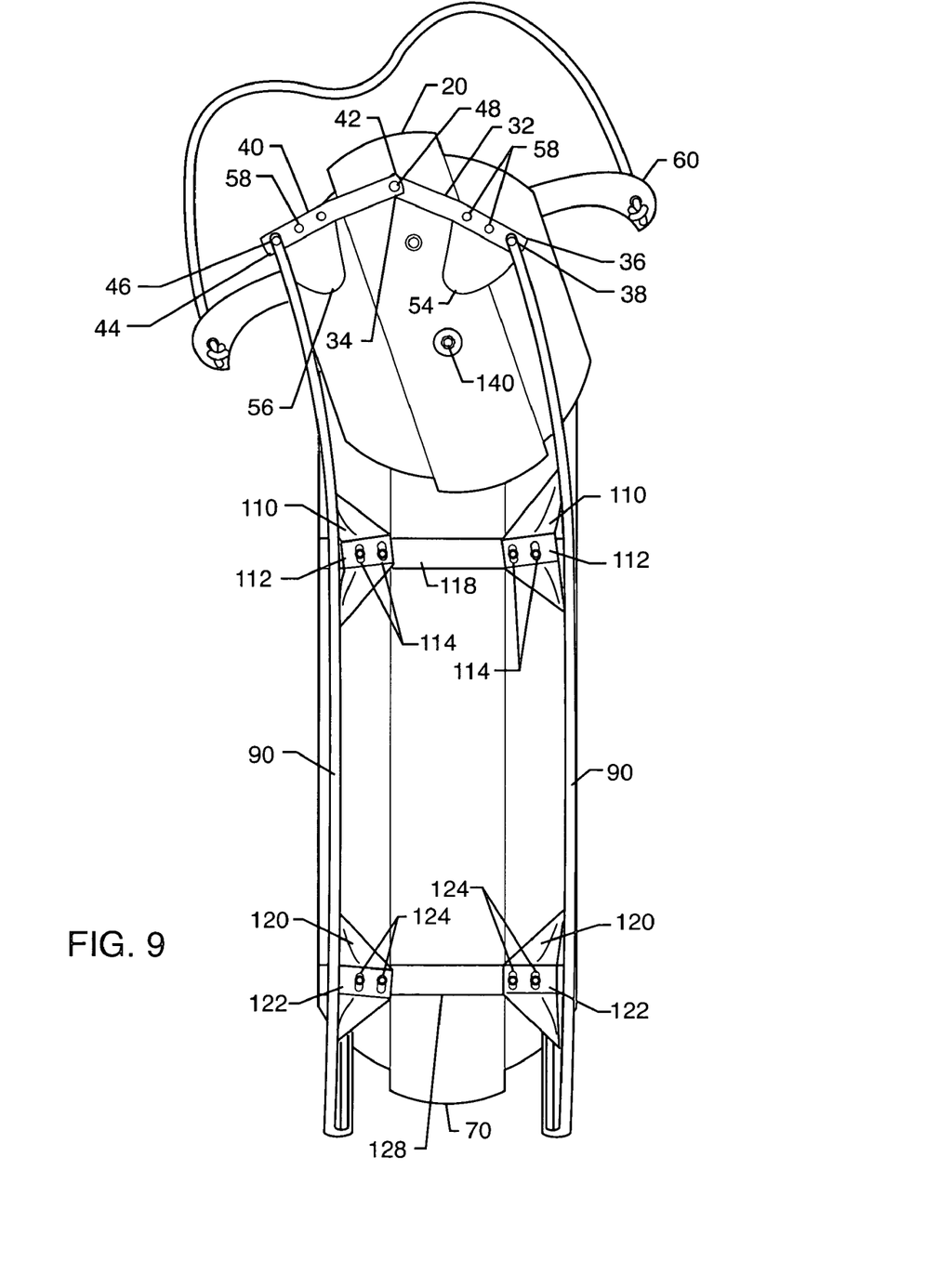
FIG. 9 illustrates a bottom view of an exemplary sled according to the present invention showing the forward section pivoted in relation to the front section and the runners curved.

When turning pressure is applied to steering arm 60 by a rider, forward section 20 pivots with relation to rear section 20, and also causes movement of connecting bars 32 and 40 of pivotable joint 48, causing runners 90 to bend and flex, which is best illustrated in FIG. 9. The inclusion and construction of pivoting assembly 30 allows for sharper turning than that of any previous design of runner sled.

Each straight portion 94 of runner 90 is attached to rear section 70 of sled 10 at intermediate connection 110 and rear connection 120. While the embodiments illustrated show two connections between rear section 70 of sled 10 and straight portion 94, those skilled in the art will recognize that various numbers of connections could be utilized without changing the scope of the invention. Intermediate connection 110 is configured to form what will be referred to as a sliding connection, while rear connection 120 may be configured as a fixed connection or a sliding connection.

Figure 4:
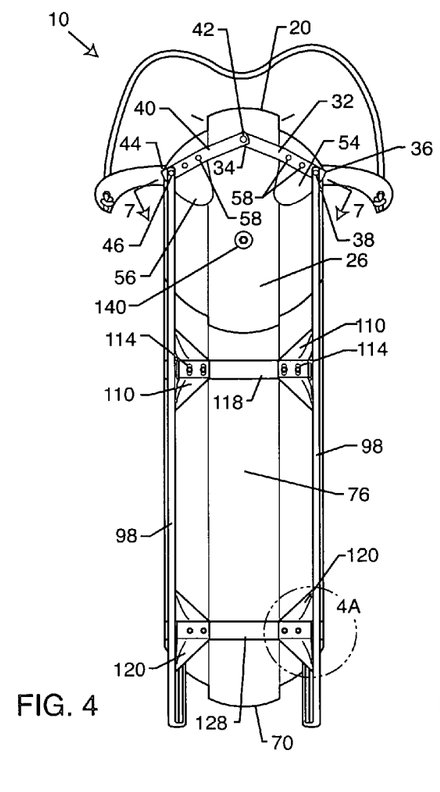
FIG. 4 illustrates a bottom view of an exemplary sled according to the present invention.

The construction of intermediate connection 110 is best illustrated in FIGS. 1 and 4. Intermediate connection 110 includes connection flange 112 attaching runner 90 to rear section 70 of sled 10. Connection flange 112 is illustrated as connecting runner 90 to mounting panel 118 mounted on the bottom surface 76 of rear section 70, although connection flange 112 could be connected directly to bottom surface 76. Connection flange 112 includes a pair of elongated openings 114. Fasteners 116 extend through second platform 72, mounting panel 118 and elongated openings 114 and secure these parts together. Each fastener 116 includes a bolt and plastic washer.

The inclusion of elongated openings 114 in connection flange 112 allows some sliding movement of the connecting flange 112 between the ends of the elongated slots, when runner 90 curves and flexes, when sled 10 is being turned by turning pressure applied to steering arm 60 by a rider. Thus, in the preferred embodiment of the invention, intermediate connections 110 are referred to as sliding connections.

Figure 4A:
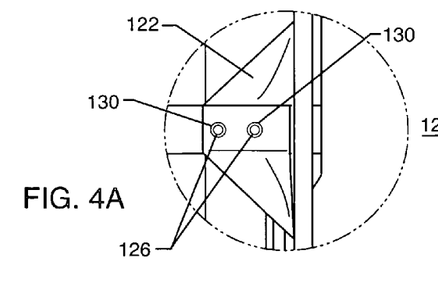
FIG. 4A illustrates a sectional view taken at circle 4A in FIG. 4.
Figure 5:
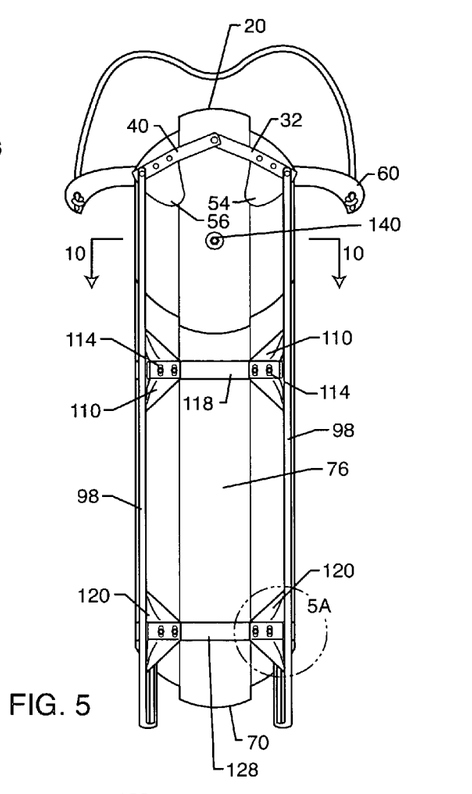
FIG. 5 illustrates a bottom view of an alternative embodiment according to the present invention.
Figure 5A:
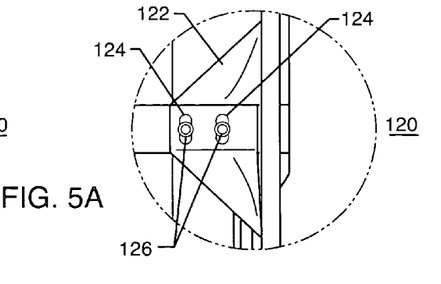
FIG. 5A illustrates a sectional view taken at circle 5A in FIG. 5.
Figure 6:
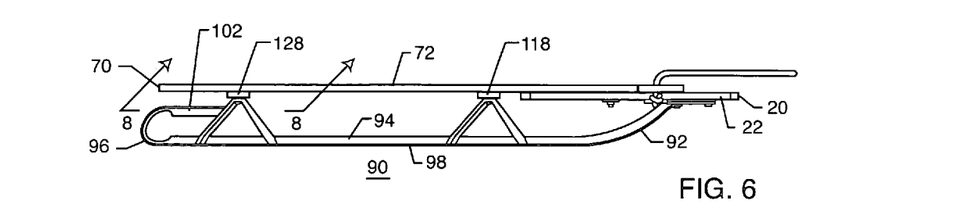
FIG. 6 illustrates a side view of an alternative embodiment according to the present invention.

The construction of each rear connection 120 in the preferred embodiment of the invention is best illustrated in FIG. 4A. Rear connection 120 includes connection flange 122 attaching runner 90 to rear section 70 of sled 10. Connection flange 122 is illustrated as connecting runner 90 to mounting panel 128 mounted on the bottom surface 76 of rear section 70, although connection flange 122 could be connected directly to bottom surface 76. Connection flange 122 includes a pair of openings 130. Fasteners 126 extend through second platform 72, mounting panel 128 and openings 124 and secure these parts together.

In the preferred embodiment of the invention, openings 130 are sized to allow for fasteners to fit through, but not to allow connection flange to slide when turning pressure is applied to steering arm 60, thus forming what is referred to as a fixed connection.

In an alternative embodiment of the invention, as illustrated in FIGS. 5, 5A, 6, 8, 8A and 8B, each rear connection 120 is constructed similar to each intermediate connection 110 as a sliding connection, with the inclusion of elongated openings 124 to allow for connection flange 122 to slide forward or backward in relation to rear section 70 when runner 90 flexes and curves in response to turning pressure applied to steering arm 60 by a rider.

Figure 8A:
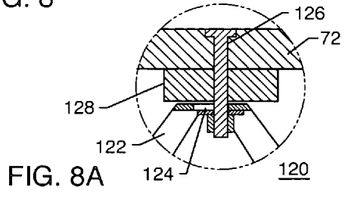
FIG. 8A illustrates a sectional view taken at circle 8A in FIG. 8 showing the connection flange having moved towards the rear of the sled in response to curving of the runner.
Figure 8B:
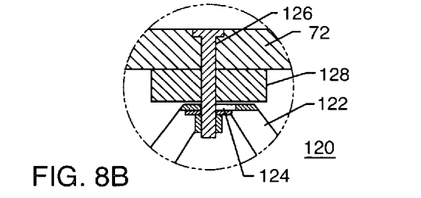
FIG. 8B illustrates a sectional view taken at circle 8B in FIG. 8 showing the connection flange having moved towards the front of the sled in response to curving of the runner.

FIGS. 8, 8A, and 8B illustrate the movement of connection flange 122 in the sliding connection configuration. In this configuration, each fastener 126 includes a bolt and plastic washer. In FIG. 8, connection flange 122 is in the normal (unflexed) position, with fastener 126 located between the ends of elongated opening 124; in FIG. 8A, connection flange 122 has moved in response to turning pressure on steering arm 60 so that fastener 126 is adjacent one end of elongated opening 124, while in FIG. 8B, fastener 126 is adjacent the other end of elongated opening 124, because connection flange 122 has moved in response to turning pressure applied to turning arm 60 in the opposite direction from the direction turned in FIG. 8A.

FIG. 9 illustrates that when forward section 20 is pivoted in relation to rear section 70, runners 90 flex and curve, and connection flanges 112 and 122 slide in response to the pivoting and curving forces.

Figure 10:
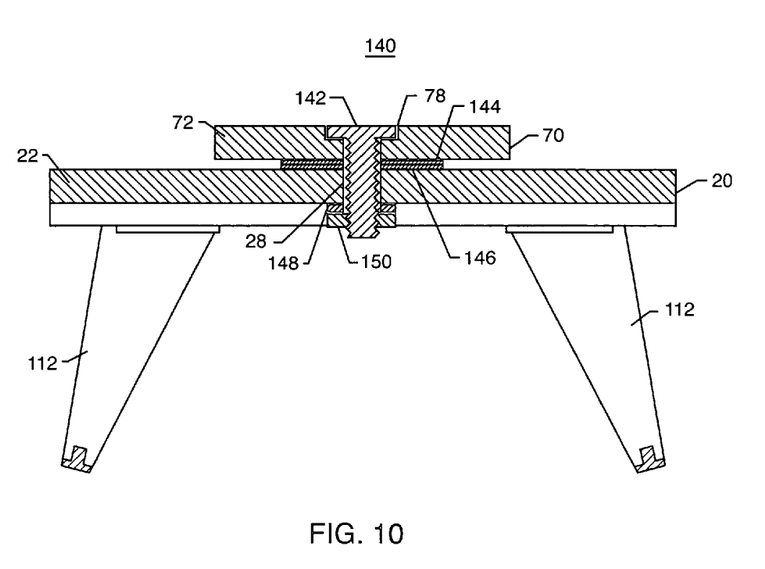
FIG. 10 illustrates a sectional view taken along line 10-10 in FIG. 5.

The construction of pivotable fastening means 140 is illustrated in FIGS. 1 and 10. In the preferred embodiment of the invention, a flat-head elevator bolt 142 is inserted through opening 78 in second platform 72 and opening 28 in first platform 22. In the preferred embodiment of the invention, the head of bolt 142 should be flush with top surface 74 of second platform 72. A pair of large plastic washers 144 and 146 is mounted between second platform 72 and first platform 22, at openings 78 and 28 respectively, and bolt 142 extends through washers 144 and 146. Another washer 148 is located at opening 28 at bottom surface 26 of first platform 22, and bolt 142 extends through it. Locking nut 150 secures bolt 142, second platform 72, washers 144 and 146, first platform 22 and washer 148 together so that forward section 20 and rear section 70 are secured together, but allows forward section 20 to be pivoted in relation to rear section 70 to enable sled 10 to be turned and steered by the user while sled 10 is being used for sliding down a hill. Other ways of forming the pivotable connection include using a rivet, a fixed metal rod welded at either end, a plastic rod that is enclosed at either end, or a flexible, durable piece of plastic or other elastic material that can twist to allow pivoting.

The foregoing descriptions of exemplary embodiments of the present invention has been presented for purposes of enablement, illustration, and description. It is not intended to be exhaustive of or to limit the present invention to the precise forms discussed. There are, however, other configurations for recreational sliding devices not specifically described herein, but with which the present invention is applicable. The present invention should therefore not be seen as limited to the particular embodiment described herein; rather, it should be understood that the present invention has wide applicability with respect to recreational sliding devices. Such other configurations can be achieved by those skilled in the art in view of the description herein. Accordingly, the scope of the invention is defined by the following claims.

What is claimed is:

1. A steerable snow sled comprising:
    a forward section including a first platform having a top surface and a bottom surface;
    a rear section pivotably attached to said forward section, said rear section including a second platform having a top surface and a bottom surface;
    a pivotable fastening means connecting said forward section and said rear section;
    a steering arm attached to said top surface of the first platform;
    a pair of runners disposed generally parallel with respect to each other attached to the bottom surface of the first platform and the bottom surface of the second platform; and
    a pivoting assembly mounted to the bottom surface of said first platform connecting said first platform to said runners, wherein said pivoting assembly comprises:
        a pair of connecting bars, each connecting bar having a first end and a second end, said bars connected to the first platform at their respective first ends forming a pivotable joint, with their respective second ends extending away from said joint, each of said second ends connected to one of the runners; and
        a sliding pad disposed along each of said connecting bars,
    whereby, a person lying or sitting on the sled may cause the sled to turn by applying turning pressure to the steering arm, causing the forward section to pivot with respect to the rear section.

2. A steerable snow sled comprising:
    a forward section including a first platform having a top surface and a bottom surface;
    a rear section pivotably attached to said forward section, said rear section including a second platform having a top surface and a bottom surface;
    a steering arm attached to said top surface of the first platform;
    a pair of runners disposed generally parallel with respect to each other pivotably attached to the bottom surface of said first platform and attached to the bottom surface of said second platform at a plurality of sliding connections; and
    a pivoting assembly mounted to the bottom surface of said first platform connecting said first platform to said runners, wherein said pivoting assembly comprises:
        a pair of connecting bars, each connecting bar having a first end and a second end, said bars connected to the first platform at their respective first ends forming a pivotable joint, with their respective second ends extending away from said joint, each of said second ends connected to one of the runners; and
        a sliding pad disposed along each of said connecting bars,
    whereby, a person lying or sitting on the sled may cause the sled to turn by applying turning pressure to the steering arm, causing the forward section to pivot with respect to the rear section and causing the runners to bend in the direction of the turn.

* * * * *